United States Patent [19]

Fushiya

[11] Patent Number: 4,870,758

[45] Date of Patent: Oct. 3, 1989

[54] PORTABLE CIRCULAR SAW

[75] Inventor: Fusao Fushiya, Anjo, Japan

[73] Assignee: Makita Electric Works, Ltd., Anjo, Japan

[21] Appl. No.: 190,831

[22] Filed: May 6, 1988

[30] Foreign Application Priority Data

Dec. 5, 1987 [JP] Japan .......................... 62-185706[U]

[51] Int. Cl.[4] ............................................. B23D 45/16

[52] U.S. Cl. ...................................... 30/388; 30/390; 30/296.1

[58] Field of Search ................. 30/388, 296, 390, 391, 30/505, 151

[56] References Cited

U.S. PATENT DOCUMENTS 3,623,518 11/1971 Micotra ............................ 30/388 X 4,787,145 11/1988 Klicker et al. .................... 30/388 X

FOREIGN PATENT DOCUMENTS 644666 10/1950 United Kingdom .................. 30/388

*Primary Examiner*—Frank T. Yost

*Assistant Examiner*—Willmon Fridie

*Attorney, Agent, or Firm*—Dennison, Meserole, Pollack & Scheiner

[57] ABSTRACT

A portable circular saw includes a housing having an electric motor mounted therein. A circular saw blade is attached to the housing and is adapted to be driven by the electric motor. A handle is carried by the housing. A base plate is disposed below the housing and has an opening therein for receiving substantially the lower half of the saw blade. Support means is mounted on the front end of the base plate for supporting the housing for pivotal movement relative to the base plate, and has a stand portion disposed in laterally spaced apart aligned relation to the front end of the base plate. Thus, the circular saw may be rested in an upright position by the front end of the base plate and the stand portion of the support means.

3 Claims, 4 Drawing Sheets

PORTABLE CIRCULAR SAW

BACKGROUND OF THE INVENTION

1. Field of the Invention

The present invention relates to portable circular saws.

2. Description of the Prior Art

In general, portable circular saws include a housing enclosing an electric motor therein, a handle carried by the housing, a circular saw blade operatively connected to the electric motor, a blade case fixed to the housing and adapted to enclose substantially the upper half of the saw blade, a base plate for supporting the housing thereon, and a safety cover pivotally mounted on the housing and adapted to cover substantially the lower half of the saw blade projecting from the base plate. In one common construction for such circular saws, the housing is mounted on the front and rear ends of the base plate for pivotal movement in both the longitudinal and transverse directions of the base plate. Thus, the amount of projection of the circular saw blade below the base plate may be adjusted and further, the tilt angle of the circular saw blade relative to the base plate may be adjusted. In some designs, the drive shaft of the motor is arranged in parallel to the circular saw blade, and the handle is located at the rear portion of the whole saw.

In any of the above described conventional circular saws, when it is desired to temporarily rest the saw on a work site or the like in practice, it must be supported on a side edge of the base plate and the safety cover covering the lower half of the circular saw blade projecting from the base plate. While the circular saw is in its rest position, the base plate is transversely tilted, or the saw body is transversely tilted.

In many cases, however, the portable circular saw is operated to cut a workpiece with the base plate held upright with respect to the horizontal plane. If the operation is completed by a single cut, no problem will be caused in the operating performance of the circular saw which is set in the transversely tilted rest position as mentioned above. However, when several continuous cutting operations are performed, a series of actions have to be repeated, which includes gripping the handle, raising up the saw body from the tilted rest position to the upright position to cut a workpiece and, after cutting the workpiece, replacing the saw body to the transversely tilted position. In particular, the action of raising up the saw body from the transversely tilted rest position to the upright position has to be repeated at every cutting operation, thus reducing the efficiency in use.

Further, when the safety cover pivotally covering the circular saw blade is rested on a work site as described above, the safety cover may be unexpectedly pivoted to expose the cutting edge of the circular saw blade, thereby resulting in a serious accident.

SUMMARY OF THE INVENTION

It is, accordingly, an object of the present invention to avoid the difficulties encountered in the prior art portable circular saw.

It is another object of the present invention to provide a portable circular saw which may be set in an upright position.

It is a further object of the present invention to provide a portable circular saw which improve the efficiency and safety of the cutting operation.

According to the present invention, there is provided a portable circular saw which comprises a housing, an electric motor mounted in the housing, a circular saw blade attached to the housing and adapted to be driven by the electric motor, a handle carried by the housing, a base plate disposed below the housing and having an opening therein for receiving substantially the lower half of the circular saw blade, and support means mounted on the front end of the base plate for supporting the housing for pivotal movement relative to the base plate and having a stand portion disposed in laterally spaced apart aligned relation to the front end of the base plate. With this arrangement, the circular saw may be rested in an upright position by the front end of the base plate and the stand portion of the support means.

The present invention will become more fully apparent from the claims and description as it proceeds in connection with the drawings.

DETAILED DESCRIPTION OF THE PREFERRED EMBODIMENT

Figure 1:
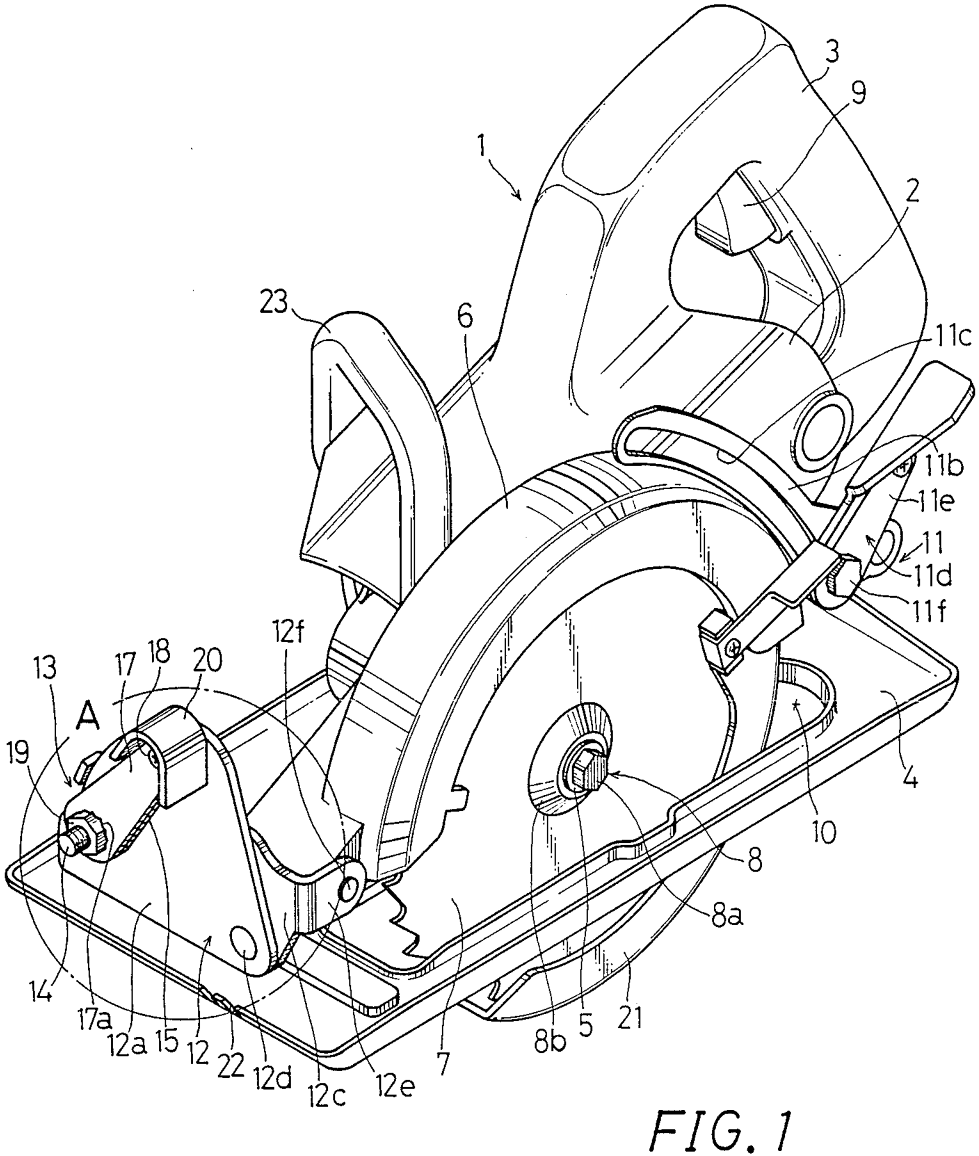
FIG. 1 is a perspective view of a portable circular saw according to a preferred embodiment of the present invention.
Figure 2:
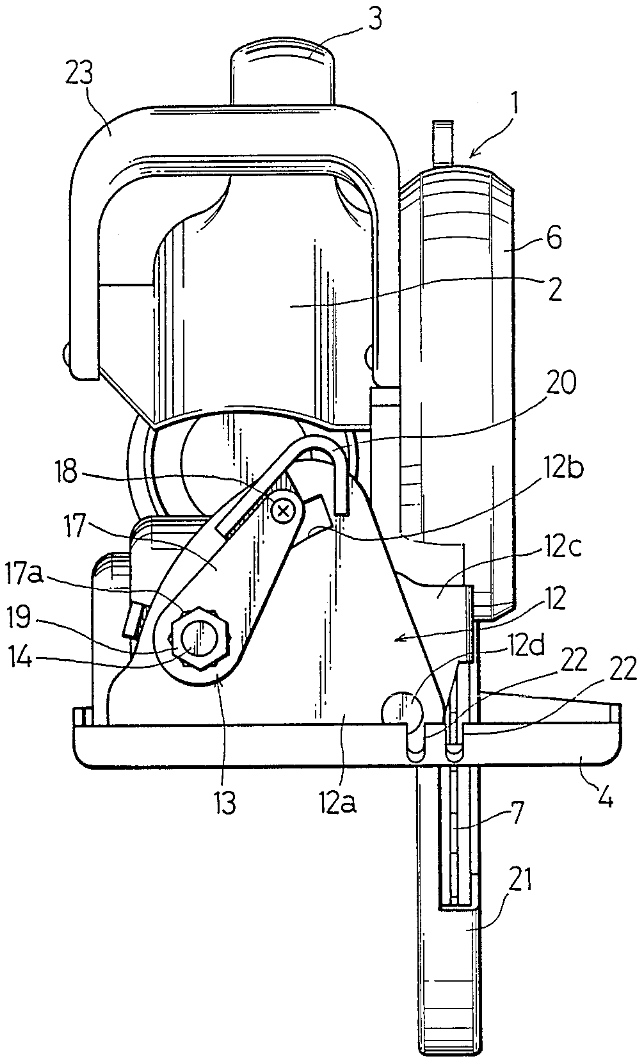
FIG. 2 is a front view of the circular saw of FIG. 1.
Figure 3:
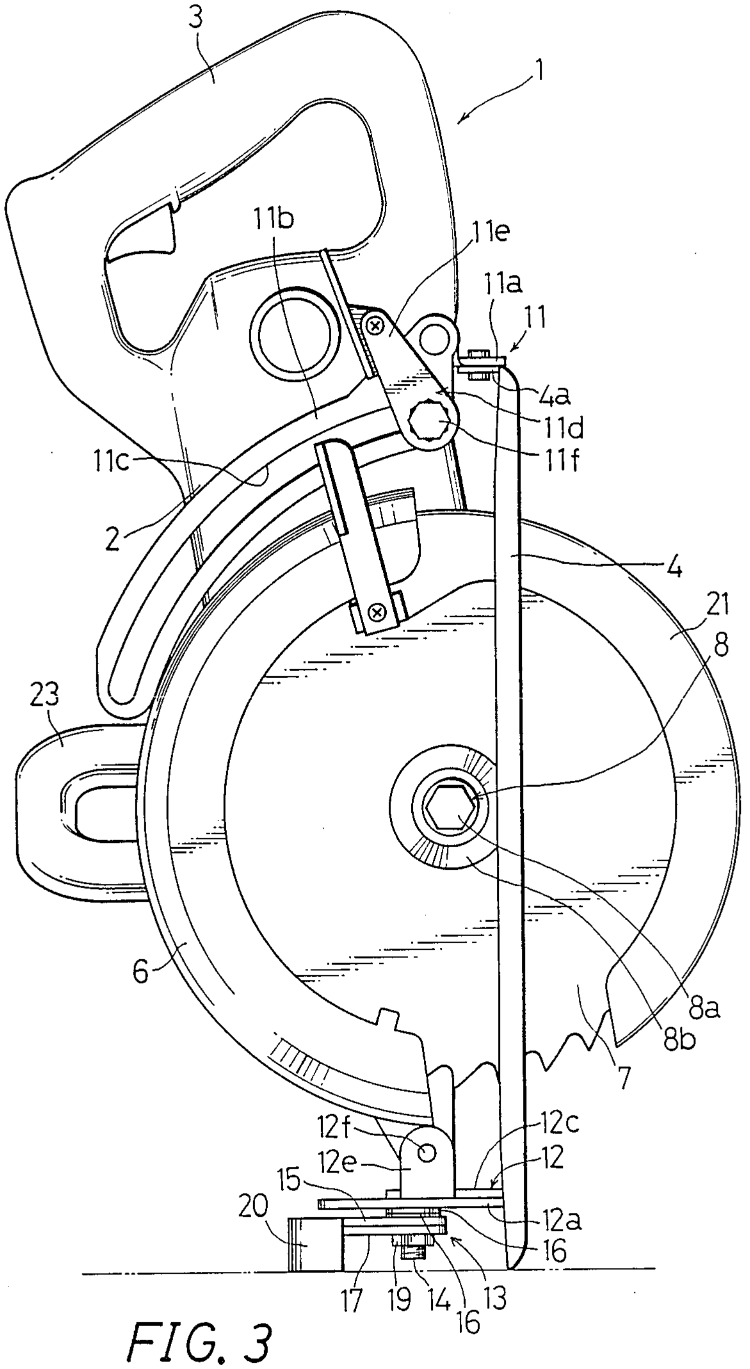
FIG. 3 is a side view of the circular saw of FIG. 1, with the saw shown in the upright rest position.

Referring now to FIGS. 1 to 3, shown therein is a portable circular saw 1 constructed in accordance with the present invention. As shown therein, the circular saw 1 includes a housing 2 in which an electric motor (not shown) is mounted, a handle 3 formed integrally with the housing 2, and a base plate 4 pivotally mounted on the housing 2 for movement is both the longitudinal and transverse directions thereof.

The motor mounted in the housing 2 has a drive shaft (not shown) extending longitudinally of the base plate 4. A spindle 5 extends at right angles to the drive shaft and is adapted to be driven for rotation by the drive shaft. The spindle 5 extends through the central portion of a blade case 6 formed generally on the front side of the housing 2. A circular saw blade 7 is mounted on the projecting portion of the spindle 5 by locking means 8 including a bolt **8*a* and a locking ring 8*b*, with substantially the upper half of the saw blade 7 enclosed by the blade case 6**.

The handle 3 is formed integrally with the rear portion of the housing 2 and has a substantially U-shaped configuration extending in the direction of the longitudinal extension of the motor. A trigger switch 9 is operatively associated with the handle 3.

The base plate 4 is generally rectangular, flat plate having upturned edges. The base plate 4 has an opening 10 adjacent one longitudinal side thereof through which the saw blade 7 extends downwardly. The base plate 4 also has a first and a second support mechanism 11 and 12 mounted on the opposite ends thereof.

The first support mechanism 11 includes a substantially L-shaped movable bracket **11*a* and a support arm 11*b*. Specifically, as shown in FIG. 3, the movable bracket 11*a*** is supported by an integral support member 4*a* projecting from the rear end of the base plate 4 for tilting movement in the transverse direction of the base plate 4. The support arm 11*b* is secured to one end of the movable bracket 11*a* and has an elongated arcuate slot 11*c*. The first support mechanism 11 also includes a first connecting and locking mechanism 11*d* projecting from the housing 2. The first connecting and locking mechanism 11*d* has a lever member 11*e* for manipulation thereof and a locking nut 11*f* extending through the lever member 11*e* into the slot 11*c* of the support arm 11*b*. Although the first connecting and locking mechanism 11*d* is not described in detail, it is constructed in the same way as a second connecting and locking mechanism 13 which will be described later.

Figure 4:
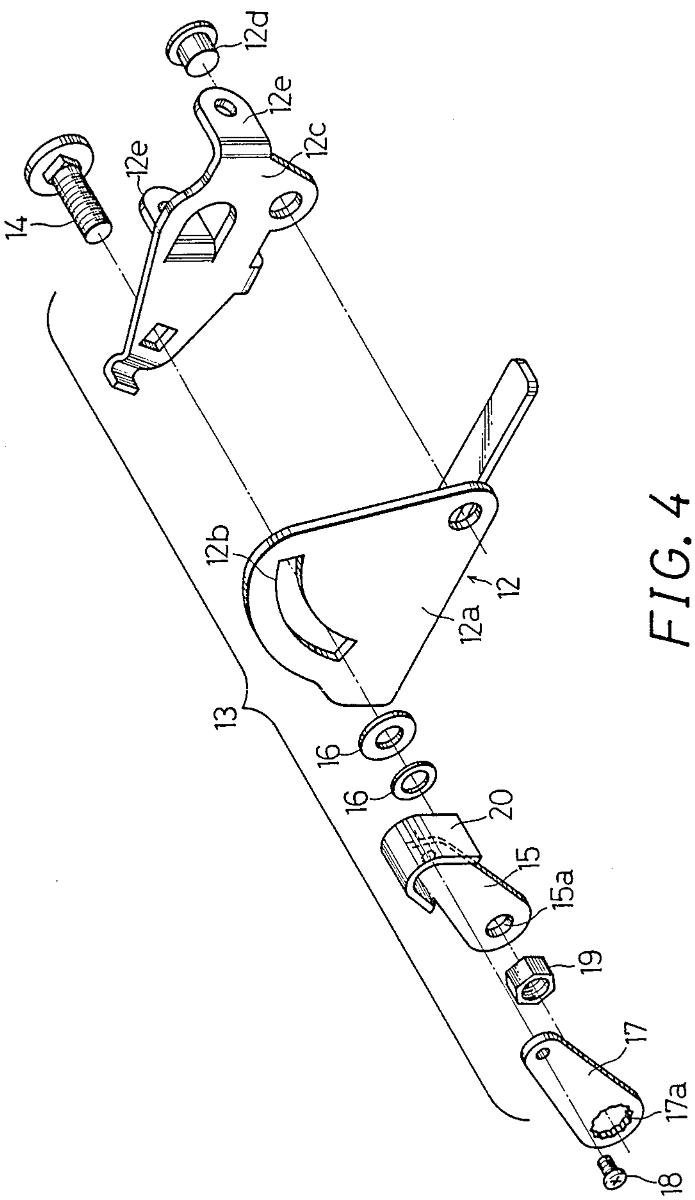
FIG. 4 is an exploded perspective view of the portion of FIG. 1 enclosed within broken line circle A.

The second support mechanism 12 includes a fixed bracket 12*a* and a movable bracket 12*c*. Specifically, as shown in FIGS. 1 and 4, the fixed bracket 12*a* is fixed to the base plate 4 in the transverse direction thereof and has an elongated arcuate slot 12*b*. The movable bracket 12*c* is supported on a portion of the fixed bracket 12*a* through a support pin 12*d* for tilting movement in the transverse direction of the base plate 4, and has a pair of support members 12*e* extending rearwardly therefrom.

With reference to FIG. 1, the forward end of the blade case 6 is supported on the movable bracket 12*c* through a support pin 12*f* for pivotal movement in the longitudinal dire ction of the base plate 4. Thus, the base plate 4 is adjustable about the axis of the support pin 12*f* to vary the amount of projection of the saw blade 7 below the base plate 4. Further, the base plate 4 is adjustable about the axis passing longitudinally through the movable bracket 11*a* of the first support mechanism 11 and the support pin 12*d* of the movable bracket 12*c*, to vary the tilt angle of the saw blade 7 relative to the base plate 4.

A second connecting and locking mechanism 13 is provided and is mounted on the fixed bracket 12*a* and the movable bracket 12*c*. Specifically, as shown in FIG. 4, the second connecting and locking mechanism 13 includes a threaded connecting bolt 14, an inner lever member 15, a small and a large washer 16, an outer lever member 17, a set screw 18, and a locking nut 19.

The connecting bolt 14 is secured to the movable bracket 12*c* through a square hole formed therein and is loosely fitted in the arcuate slot 12*b* of the fixed bracket 12*a*. The inner lever member 15 has a hole 15*a* for loosely receiving the threaded portion of the connecting bolt 14 projecting from the fixed bracket 12*a*. The washers 16 are loosely fitted on the threaded portion of the connecting bolt 14 between the fixed bracket 12*a* and the inner lever member 15. The outer lever member 17 is of the same configuration as the inner lever member 15 and has a dodecagonal hole 17*a* the center of which is aligned with that of the hole 15*a* of the inner lever member 15. The outer lever member 17 is overlapped with the inner lever member 15 and is secured thereto with the set screw 18. The locking nut 19 is threadedly engaged with the threaded portion of the connecting bolt 14 projecting from the hole 15*a* of the inner lever member 15.

Thus, upon rotation of the lever members 15 and 17, the locking nut 19 is threadedly advanced or retracted on the threaded portion of the connecting bolt 14. When the locking nut 19 is advanced, the movable bracket 12*c*, the washers 16 and the lever members 15 and 17 are locked against the opposite surfaces of the fixed bracket 12*a* by the fastening action of the connecting bolt 14 and the locking nut 19. Conversely, when the locking nut 19 is retracted, all of the movable bracket 12*c*, the washers 16 and the lever members 15 and 17 are released from the locked position against the opposite surfaces of the fixed bracket 12*a*, thereby permitting the movable bracket 12*c* to pivot about the support pin 12*d* in the transverse direction of the base plate 4.

The inner lever member 15 has a stand member 20 formed integrally with one end thereof which also serves as a knob. The stand member 20 is formed into an arcuately curved configuration to conform to the configuration of the one end of the inner lever member 15. The stand member 20 has a rear end surface facing the fixed bracket 12*a* and a front end surface aligned with and spaced a predetermined distance from the front end of the base plate 4. While the stand member 20 has been shown as an integral member, it could be a separate member to be secured to the inner lever member 15 as by welding.

With reference to FIG. 2, a safety cover 21 is pivotally connected to the blade case 6 and is normally urged by a spring (not shown) in a direction to cover substantially the lower half of the circular saw blade 7 projecting from the base plate 4. The base plate 4 has a pair of cutout portions 22 formed in the front edge thereof in alignment with the saw blade 7 so as to provide a positional indicia for the saw blade 7. Further, an auxiliary handle 23 is attached to the housing 2 and the blade case 6.

When the portable circular saw 1 thus constructed is operated for a cutting operation with the base plate 4 held upright with respect to the horizontal plane, the circular saw 1 may be rested on a work site in the same upright position as that during the operation, by the front end of the base plate 4 and the stand member 20 of the inner lever member 15 which is aligned with and spaced a predetermined distance from the front end of the base plate 4.

In such an upright position, the safety cover 21 for covering the circular saw blade 7 will not contact other objects, so that the safety cover 21 can positively cover the circular saw blade 7 under the biasing force of the spring, assuring safety to the operator at all times.

Therefore, such a cutting operation can be performed quite effectively, and the effect is remarkable especially in the so called "Skilsaw" type circular saw shown in the embodiment thus far described, in which the housing 2 has the handle 3 at the rear portion thereof and the motor is the housing 2 has the drive shaft extending in the longitudinal direction of the base plate 4.

As the stand member 20 is bent arcuately so as to increase its contact surface to the work site as much as possible, the circular saw 1 can be kept stably in its rest position.

Furthermore, as the stand member 20 is formed as a part of the inner lever member 15 or the member for adjusting the transverse tilting movement of the housing 2 relative to the base plate 4, no independent, separate member is required, permitting simplification of the construction of the stand member 20.

Of course, as with the prior art circular saws, in the circular saw of the present invention, the transverse tilting movement of the housing 2 relative to the base plate 4 can be adjusted to tilt the circular saw blade 7 relative to the base plate 4 for a cutting operation, and the longitudinal pivotal movement of the housing 2 relative to the base plate 4 can be adjusted to control the amount of projection of the circular saw blade 7.

As described above, the circular saw can be rested in the upright position, so that when it is used in the upright position for a cutting operation or the like, repeated change of positions of the circular saw during the operation which would be required in the prior art is eliminated, assuring improved efficiency and safety in use.

While the invention has been described with reference to a preferred embodiment thereof, it is to be understood that modifications or variations may be easily made without departing from the scope of the present invention which is defined by the appended claims.

What is claimed is:

1. A portable circular saw comprising:
a housing;
an electric motor mounted in said housing;
a circular saw blade attached to said housing and adapted to be driven by said electric motor;
a handle carried by said housing;
a base plate disposed below said housing and having an opening therein for receiving substantially the lower half of said saw blade;
support means mounted on said base plate adjacent the front end thereof for supporting said housing for pivotal movement relative to said base plate; and
a locking lever mounted on said support means for temporarily locking said housing to said base plate in any selected pivoted position, said locking lever having a stand portion disposed thereon and projecting forwardly therefrom into laterally spaced apart aligned relation to the front end of said base plate to define a rest means for said circular saw;
wherein said circular saw may be rested in an upright position by the front end of said base plate and said stand portion of said locking lever.

2. A portable circular saw comprising:
a housing;
an electric motor mounted in said housing;
a circular saw blade attached to said housing and adapted to be driven by said electric motor;
a handle carried by said housing;
a base plate disposed below said housing and having an opening therein for receiving substantially the lower half of said circular saw blade; and
support means mounted on said base plate for supporting said housing for pivotal movement relative to said base plate and having a stand portion disposed in laterally spaced apart aligned relation to the front end of said base plate;
wherein said circular saw may be rested in an upright position by the front end of said base plate and said stand portion of said support means;
said support means comprising:
a fixed bracket mounted on said base plate adjacent the front end thereof and in a direction transversely of said base plate and having an elongated arcuate slot therein;
a movable bracket pivotally mounted on said fixed bracket and operatively connected to said housing;
a threaded connecting bolt non-rotatably secured to said movable bracket and loosely inserted into said arcuate slot of said fixed bracket;
a locking nut threadedly fitted on said connecting bolt projecting from said fixed bracket; and
a locking lever operable to threadedly advance or retract said locking nut, said locking lever having said stand portion on a portion thereof.

3. The portable circular saw as defined in claim 2 wherein said stand portion is a stand member mounted on an upper end of said locking lever and has an arcuately curved portion which may be served as a knob for said locking lever.

* * * * *